…

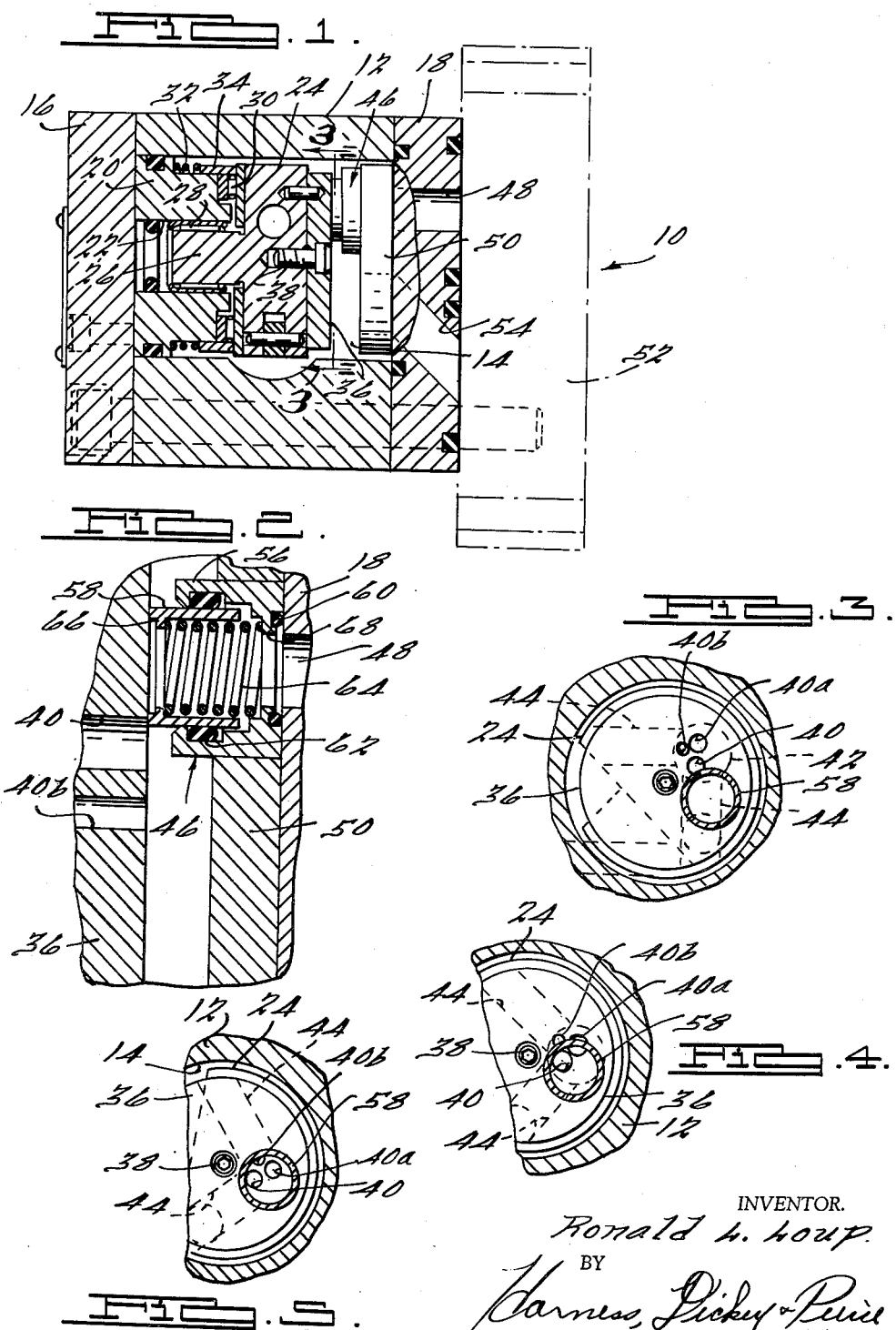

United States Patent Office 3,018,796
Patented Jan. 30, 1962

---

3,018,796
VALVE PORT ARRANGEMENT
Ronald L. Loup, Manchester, Mich., assignor to Double A Products Company, Manchester, Mich., a corporation of Michigan
Filed Nov. 24, 1958, Ser. No. 775,849
4 Claims. (Cl. 137—625.12)

This invention relates to valves and particularly to an arrangement of ports extending through a movable member disposed within a valve.

In a copending application of John J. Pippenger, filed on September 22, 1958, Serial No. 762,534, a valve is illustrated having a rotating disk therein with ports extending therethrough which are alignable with a seal seat seated against the face of the disk. The seal seat in turn is fixed relative to and aligned with an inlet port so that the inlet port is completely sealed off by the face of the disk until the disk is rotated so that the ports extending therethrough align with the seal seat to permit pressurized fluid to pass therethrough.

One of the major problems encountered in employing the seal seats disclosed in the aforementioned copending application is that when the land on the end of the seal seat which is seated against the face of the rotating disk partially overlaps the ports extending through the rotating disk the pressurized fluid acts on this newly exposed portion of the land to tend to cock or pop the seal seat. This is an extremely undesirable condition since once the seal seat "pops" it may not seat properly thereafter and, of course, if the seal seat should pop before it is aligned with the ports its seat on the face of the disk is broken to enable pressurized fluid to flow through the inlet port at a pressure at which it should be completely sealed off.

It is one object of the present invention to provide a valve port arrangement that enables the ports to be aligned with a seal seat without cocking or popping the seal seat.

It is another object of the invention to provide a valve port arrangement for a movable member having a seal seat seated against one face thereof which enables the ports to be aligned with the seal seat without lifting the seal seat from the face of the member.

It is a further object of the invention to provide a valve port arrangement for cooperation with a seal seat which prevents popping of the seal seat in a relatively simple yet effective manner without increasing the force required to shift the valve to align the ports with the seal seat.

Other objects, features and advantages of the present invention will becomes apparent from the following detailed description taken in conjunction with the accompanying drawings, in which:

FIGURE 1 is a sectional view of one valve construction with which the valve port arrangement of the present invention may be employed;

FIG. 2 is an enlarged fragmentary sectional view of the seal seat of the valve of FIG. 1;

FIG. 3 is a sectional view taken along the line 3—3 of FIG. 1;

FIG. 4 is a view similar to that of FIG. 3 showing the seal seat in a second position relative to the valve ports; and FIG. 5 is a sectional view similar to FIG. 3 showing the seal seat in a third position relative to the valve ports.

Referring to FIG. 1, one type of valve in which the valve port arrangement of the present invention may be utilized is a pressure reducing valve 10 which is of the type described and claimed in the aforementioned copending application, and reference is made to this application for a more detailed description of the valve. However, it is to be specifically understood that the pressure reducing valve 10 is being illustrated herein by way of example only and that the valve port arrangement can be employed with most types of valves having seal seats therein.

The pressure reducing valve 10 is briefly comprised of a body 12 having a chamber 14 therein with a top plate 16 secured to one end thereof and a bottom plate 18 secured to the other end thereof to enclose the chamber 14. A suitable bushing 20 having a bore 22 extending therethrough is disposed within the chamber 14, and a disk-shaped ported plate 24 having an integral depending hub portion 26 is rotatably supported within the chamber 14 by the bushing 20.

It will be observed that the hub portion 26 of the ported plate 24 projects within the bore 22 of the bushing and is rotatably supported therein by needle bearings 28. Roller bearings 30 are also positioned between the right end of the bushing 20 and the left face of the ported plate 24 to further reduce friction therebetween, and a spring 32 is positioned about the bushing with one end thereof bearing against an annular flange on the bushing and the other end thereof bearing against a retaining ring 34 which in turn bears against the ported plate to urge the bushing and ported plate apart.

A disk member 36 is fixed to the right face of the ported plate 24 by suitable bolts 38 or the like and has a plurality, in this embodiment three, closely spaced ports 40, 40a and 40b extending therethrough.

Referring to FIG. 3, the ported plate 24 has a port 42 opening on the right face thereof and aligned with the three ports 40, and two generally radially extending ports 44 which communicate with the port 42 and open on the periphery of the ported plate 24 so as to communicate with the chamber 14.

A seal seat 46 has one end thereof seated against the right face of the disk member 36 and the other end thereof seated against the left face of the bottom plate 18, the seal seat 46 being positioned and fixed in alignment with an inlet port 48 extending through the bottom plate 18 by a suitable circular plate 50 fixed to the left face of the bottom plate 18 and having an aperture therein for receiving the seal seat 46 in a manner to permit it to seat against the bottom plate 18. A suitable subplate 52, illustrated in dotted and dash lines in FIG. 1, may be fixed to the bottom plate 18 for connecting conduits and the like to the inlet port 48 and an outlet port 54 extending through the bottom plate, the outlet 54 being aligned with another aperture in the circular member 50 so as to communicate with the chamber 14.

Suitable means (not shown) are provided for rotating the ported plate 24 for moving the ports 40 on the disk member 36 into and out of alignment with the left end of the seal seat 46. When the ports are not in alignment wtih the seal seat, the seal seat seats against the right face of the disk 36 to completely seal off the inlet port 48, when the ports 40 are aligned or partially aligned with the seal seat pressurized fluid may pass through the inlet port 48, the seal seat 46, ports 40, 42 and 44, into the chamber 14, and out through the outlet port 54. The ported plate 24 is rotated in response to the pressure of the fluid within the chamber 14 to achieve the pressure reducting function of the valve 10, as completely described in the aforementioned copending application.

The seal seat 46 may be of the type comprising a pair of telescoping sleeves 56 and 58 with an O-ring 60 disposed within an annular groove on the right end of the outer sleeve 56, so as to seal against the left face of the bottom plate 18 and about the inlet port 48. A suitable O-ring 62 is also disposed between the telescoping sleeves 56 and 58 within an annular groove in the inner face of the sleeve 56 to provide a sliding seal therebetween. A spring 64 is disposed between the sleeves with one end thereof bearing against an internal annular flange 66 on the sleeve 58 and the other end thereof bearing against an internal annular flange 68 on the sleeve 56 to urge the sleeves apart so that the ends thereof are seated against the faces of the disk member 36 and bottom plate 18, respectively. It will also be observed that each of the sleeves 56 and 58 will be self-biased against their respective surfaces by the fluid pressure within the chamber 14 acting on the exposed surfaces of the sleeves. This seal seat is also completely described in the aforementioned copending application and is illustrated herein by way of example only to provide an environment for the valve port arrangement of the present invention as will be seen.

As illustrated in FIGS. 2 and 3, the left end of the sleeve 58 is seated against the face of the disk member 36 with just a portion of the land on the left end thereof overlapping the hole 40. In this position the inlet port 48 is to be completedy sealed off from communication with the chamber 14 since the pressurized fluid within the chamber 14 which passes out the outlet port 54 to a suitable working device is now at the desired maximum outlet pressure, the inlet port 48 being connected to a high pressure source.

It will be observed that the seal seat is self biasing since the surface area of the sleeves 56 and 58 which is exposed to the fluid pressure within the chamber 14 causes the fluid pressure to bias each of the sleeves against their respective seating surfaces with a force in addition to that of the spring 64. By providing a plurality of ports 40 instead of one port having the same total area, it is readily apparent that the portion or area of the land in the left end of the sleeve 58 that can overlap the port as illustrated in FIGS. 2 and 3 is significantly reduced. By reducing this overlapping area of the land, the tendency of the pressurized fluid within the chamber 14 to act on this newly exposed land area to lift the sleeve 58 with a cocking action is reduced.

This lifting or cocking of the sleeve 58 is commonly referred to in the art as "popping," and manifestly, it is extremely undesirable. Should the sleeve 58 of the seal seat pop in this manner, it is apparent that the inlet port 48 would immediately communicate with the chamber 14 to increase the pressure therein and thus increase the pressure at the outlet port and the device connected to the outlet port prematurely and possibly excessively.

Since the ported plate 24 is adapted to be rotated in response to the pressure of the fluid within the chamber 14, it will move the port 40 into alignment with the sleeve 58 when the pressure of the fluid within the chamber 14 drops below the predetermined maximum outlet pressure desired. Therefore, it is readily apparent that a premature popping of the sleeve 58 cannot be tolerated. When the pressure of the fluid within the chamber 14 drops below the predetermined maximum outlet pressure desired, the ported plate 24 is rotated in a clockwise direction as viewed in FIGS. 3, 4 and 5, to the position illustrated in FIG. 4, then to the position illustrated in FIG. 5 and finally to a position of complete alignment (not shown) wherein all three of the ports are disposed within the sleeve 58.

Referring to FIG. 4, as the port 40 passes completely within the sleeve 58 so as to be completely aligned therewith, the port 40a is partially aligned with the sleeve 58 so that the area of the land on the end of the sleeve overlying the port 40a is exposed to the fluid pressure within the chamber 14, and as illustrated in FIG. 5 as the port 40a moves completely within the sleeve 58 of the seal seat 46, the port 40b is overlapped by a portion of the land of the sleeve. Thus, each of the ports move beneath a portion of the land area of the sleeve 58 in a predetermined sequence so that a minimum area of the land overlaps the ports at any given time to reduce the force with which the pressurized fluid acts on the portions of the land overlapping the ports, as compared with the force that would be created if one port were provided having the same area as the total area of the three ports 40. This is because the area of the land of the sleeve 58 overlapping one large port in any of the positions of the sleeve 58 illustrated in FIGS. 2–5 would be significantly greater and would tend to pop the seal seat.

Since a seal seat is generally adapted to be employed in a high pressure valve, if it should pop in the position illustrated in FIG. 4, the pressurized fluid would flow swiftly beneath the lifted side of the sleeve 58 at a high velocity, and experience has proved that the velocity of the fluid will tend to keep the sleeve 58 cocked so that it will not satisfactorily seat itself either after it is completely aligned with all three ports, or after it is completely moved out of alignment with the ports, as illustrated in FIG. 2. However, by providing the three ports 40 rather than one large port, this critical problem has been effectively overcome.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What is claimed is:

1. A valve having a movable disc therein, and a seal seat therein seated against one face of said movable disc, said seal seat being loosely retained in a hollow passage portion of the valve with means to seal the seal seat relative to the passage portion and being self-biased or urged against said face by fluid pressure within the valve acting on the differential area between the portions of the surface of said seal seat exposed to the fluid pressure, a plurality of ports opening on said movable disc and alignable with said seal seat by relative movement between said seal seat and movable disc, said ports being closely spaced relative to one another so that at least a portion of each port can be simultaneously aligned with said seal seat in one position of the seal seat relative to said movable disc.

2. A valve having a movable disc therein, and a seal seat therein seated against one face of said movable disc, said seal seat being loosely retained in a hollow passage portion of the valve with means to seal the seal seat relative to the passage portion and being self-biased or urged against said face by fluid pressure within the valve acting on the differential area between the portions of the surface of said seal seat exposed to the fluid pressure, a plurality of ports opening on said movable disc and spaced so as to be simultaneously alignable with said seal seat, said ports being oriented and arranged relative to one another so as to align with said seat in a predetermined sequence whereby the unbalancing force exerted on said seal seat during the alignment of said ports with said seal seat is less than the unbalancing force that would be exerted on said seal seat if one port having the same cross sectional area as the total cross sectional area of said ports were employed.

3. A valve having a rotating disk therein and a seal seat seated against one face of said disk, said seal seat being loosely retained in a hollow passage portion of the valve with means to seal the seal seat relative to the passage portion and being self-biased or urged against said face by fluid pressure within the valve acting on the differential area between the portions of the surface of said seal seat exposed to the fluid pressure, a plurality of ports extending through said disk opening on said one face and being simultaneously alignable with said seal seat means in one position of the seal seat relative to said one face, each of said ports being positioned relative to one another so as to move into alignment with said seal seat in a predetermined sequence so that the unbalancing forces exerted on said seal seat during the alignment of said ports with said seal seat is less than the unbalancing force which would result if one port were used having the same cross sectional area as the total cross sectional area of the plurality of ports.

4. A valve having a rotating disk therein and a seal seat seated or biased against one face of said disk, said seal seat being loosely retained in a hollow passage portion of the valve with means to seal the seal seat relative to the passage portion and being self-biased or urged against said face by fluid pressure within the valve acting on the differential area between the portions of the surface of said seal seat exposed to the fluid pressure, a plurality of ports extending through said disk and opening on said one face thereof in the annular path described by said seal seat on said one face when said disk is rotated relative to said seal seat, each of said port openings on said one face being disposed within an area equal to or less than the area on said one face enclosed by said seal seat.

References Cited in the file of this patent
UNITED STATES PATENTS

| | | |
|---|---|---|
| 1,702,982 | Schroder | Feb. 19, 1929 |
| 2,832,561 | Holl | Apr. 29, 1958 |
| 2,845,948 | Parker | Aug. 5, 1958 |
| 2,858,847 | Collins | Nov. 4, 1958 |